(12) United States Patent
Ostrovski et al.

(10) Patent No.: US 6,787,121 B1
(45) Date of Patent: Sep. 7, 2004

(54) SOLID STATE REDUCTION OF OXIDES (75) Inventors: Oleg Ostrovski, Bondi Beach (AU); Michael Yastreboff, Wollstonecraft (AU); Rankin Findlay Johnston, Mandurang (AU); Nathaniel Anacleto, Hillside (AU); Samir Ganguly, Taemania (AU)

(73) Assignees: Unisearch Limited, Sydney (AU); Temco Pty LTD, Brisbane (AU)

( * ) Notice: Subject to any disclaimer, the term of this patent is extended or adjusted under 35 U.S.C. 154(b) by 0 days.

(21) Appl. No.: 10/110,473
(22) PCT Filed: Sep. 20, 2000
(86) PCT No.: PCT/AU00/01149
§ 371 (c)(1),
(2), (4) Date: Apr. 12, 2002
(87) PCT Pub. No.: WO01/21845
PCT Pub. Date: Mar. 29, 2001

(30) Foreign Application Priority Data

Sep. 20, 1999 (AU) .............................. PQ2976

(51) Int. Cl.$^7$ .............................. C01B 31/30
(52) U.S. Cl. ...................................... 423/439
(58) Field of Search ................... 423/439, 440

(56) References Cited

U.S. PATENT DOCUMENTS 5,338,523 A * 8/1994 Krstic ........................ 423/439

* cited by examiner

Primary Examiner—Stuart Hendrickson
(74) Attorney, Agent, or Firm—Nixon & Vanderhye (57) ABSTRACT

A process for the reduction of a manganese oxide to manganese carbide, the process including contacting the metal oxide in solid form with a gaseous reducing/carburising agent and optionally an inert gas at elevated temperature.

18 Claims, 11 Drawing Sheets

Figure 7    Reduction time, min

Figure 8    Reduction time, min

Figure 15  Reduction time, min

Figure 16  Reduction time, min

SOLID STATE REDUCTION OF OXIDES

FIELD OF THE INVENTION

This invention relates to a new method for the reduction of manganese oxides and is particularly concerned with a method for the solid state reduction of manganese oxides.

BACKGROUND OF THE INVENTION

Manganese is a commercially important transition metal. Various techniques are used to extract this transition metal from ores.

Maganese coined with other elements is widely distributed in the Earth's crust The most important ore consists primarily of maganese dioxides in the form of pyrolusite, psilomelane manganite, rhodochrosite or sea nodules. Manganese alloys are conventionally produced through carbothermic reduction of ore and smelting in an electric are furnace. High carbon ferromanganese is also produced in the blast furnace.

The present invention is based on the realisation that manganese oxides can be reduced directly to the carbide where the carbon required for reduction is provided in the form of a gaseous hydrocarbon, for example, methane.

U.S. Pat. No. 4,053,301 describes a process for the direct production of iron carbide from particulate iron oxides reduced using a methane (hydrocarbon)-hydrogen mixture. In the process, fine iron ore is reduced to the metallic state by contacting the ore with hydrogen at a temperature between 595° C. and 705° C. in a fluidised bed. The reduced iron is then carburised by methane (hydrocarbon). Thus, in the reaction of iron oxide with the methane-hydrogen mixture he products of reduction are iron carbide and $H_2O$, and the overall reaction of the reduction process is presented as:

$$3Fe_xO + xCH_4 + (3-2x)H_2 = xFe_3C + 3H_2O$$

As will be discussed in more detail below, reduction of an oxide by methane (hydrocarbon) in the method of the present invention is fundamentally different from the prior art of iron oxide reductant in that it occurs directly into the carbide phase from the solid material, eg. an ore, with formation of CO.

DISCLOSURE OF THE INVENTION

The process of the present invention may be characterised as pyrometallurgical in nature and based on the use of gaseous reductants, wherein the carbon required for the reduction is supplied from the gas phase.

Accordingly, in a first aspect, the present invention provides a process for the reduction of a manganese oxide to manganese carbide, the process including contacting the manganese oxide in solid form with a gaseous reducing and carburising agent and optionally an inert gas at elevated temperature.

The reducing/carburising gas may be a gaseous hydrocarbon-hydrogen gas mixture. The hydrocarbon may be an alkane, for example, methane, ethane, propane or it may be a mixture of two or more alkanes, or a natural gas can be used, which is optionally cleaned prior to use. Preferably the hydrocarbon is methane. Preferably the hydrocarbon may be present in an amount of about 5–20%, more preferably 7–15%.

Preferably hydrogen in the reducing/carburising gas is present in an amount of about 20 to 95%.

The optional inert carrier gas may be nitrogen or argon. The inert carrier gas may be present in an amount of 0 to 60%.

Preferably the manganese oxide is present in a material having a high gas permeability to allow widespread access of the reducing gas to the oxide phase. Preferably the material treated in the process of the invention has a high porosity, high surface area and is not melted or sintered during the reduction reaction. Preferably the manganese oxide is in particulate form The material treated in the process of the invention may be an ore containing one or more metal oxides. The ore may be in the form of a pre-concentrate or concentrate. The ore maybe subjected to one or more pre-treatments, for example, concentration by chemical and/or physical means prior to being treated in accordance with the process of the invention. Preferably, the oxide is pre-treated by calcination with hot inert or reducing gases at about 800–1100° C. to remove moisture and pre-reduce $MnO_2$ and $MnO_2O_3$ to MnO and decompose carbonates.

Preferably the process of the invention is carried out at a temperature high enough for the reduction reaction to take place but not so high as to result in significant melting or sintering of the material being treated.

Preferably the process of the invention is carried out at a temperature in the range of about 1000–1250° C., more preferably between 1030–1150° C.

The process of the invention may be carried out in any suitable reactor. The reactor may be a fluidised bed reactor or a packed bed reactor. A packed bed may be used if ore particles are prone to sticking. Selection of the most appropriate mode of the process depends on the ore composition, size, and gas composition used.

Preferably the CO is minimised in the reactor atmosphere during the process of the invention. The off-gas from the reactor used to perform the process of the invention may be recycled back to the reactor. Where the off-gas is recycled, it is preferable that CO be removed before recycling to the reaction volume. Some of the gases (reactant gases, off-gases or a separate stream) may be combusted at anytime before, during or after the reactor for the provision of heat either to the reaction volume or to the entering feed.

Hydrogen gas maybe supplied to the reaction to enable the reduction of the iron oxide, present in manganese ore. Silica present in the feed material may partly also be reduced. For example, manganese ores with up to about 12% silica may be treated in accordance with the process of the invention.

The manganese oxide reduction process of the present invention may proceed via the following reaction.

$$MnO + 10/7 CH_4 = 1/7 Mn_7C_1 + CO + 20/7 H_2$$

It is readily apparent that this reaction is fundamentally different from the reduction of iron oxide with methane in that the transition metal is converted directly to the carbide phase with the formation of CO gas.

The standard Gibbs free energy of MnO reduction to $Mn_2C_1$ is equal to $\Delta G° = 377682 - 314.44T$, J which means that this reaction proceeds spontaneously at temperatures of 1201° K. and above when the species are in their standard states. The equilibrium constant for this reaction is log $K = 10/7 \log(P_{H2}/P_{CH4}) + \log P_{CO}$ which is equal to about 10 at 1000° C. 100 at 1100° C. and 1000 at 1200° C. This indicates that MnO reduction to manganese carbide is feasible and has a high extent at 1000–1200° C.

Manganese ore, apart from the manganese oxide itself, may contain oxides of iron, silicon and other metals. It is known from literature, that in the process of gas reduction, iron is easily reduced by hydrogen and/or CO gas to the metallic state. Manganese oxide is reduced practically only to its lowest oxidation state MnO.

Examples of materials that cam be treated in the process of the present invention are pure oxides of manganese, Groote Eylandt manganese ores, Wessels manganese ores, and other manganese ores. Preferably the treatment is carried out on particles having a particle size of less than about 2 mm.

The manganese ore is preferably pre-treated with hot inert or reducing gases at about 800–1100° C. Superior kinetics may be achieved by pre-treating the ore (oxide) which includes removal of moisture and carbonate decomposition. The calcined solids may then be reduced in a fixed bed reactor or fluidised reactor supplied with an inert gas (such as argon or nitrogen)-hydrogen-methane mixture, and in which the metal oxides are reduced to the carbide. The methane is preferably supplied to the reactor at such a rate and ratio to hydrogen to provide sufficient carbon activity for the reduction of metal oxides and to maintain the desired carbon content in the final product. Hydrogen is introduced to control the activity of carbon in the gas phase.

At a temperature at which the process of this invention is carried out, $CH_4$ is unstable. We have found that by using metastable $CH_4$, a much higher carbon activity in the gas phase can be obtained than that currently available in conventional carbothermic processes.

Accordingly, in a further aspect, the present invention provides a process for the reduction of manganese oxide to manganese carbide, the process including contacting the metal oxide in solid form with a gaseous carburising/reducing agent at an elevated temperature in the presence of an agent that extends the metastability of the gaseous carburising/reducing agent.

Preferably the metastability extending agent is sulphur dissolved in the gas phase.

The gaseous reduction technology of the present invention may provide the following advantages over the standard solid carbothermic reduction routes:

Lower operating temperatures
Ability to process fines
Faster kinetics
Decrease and possible elimination of the coke consumption in the overall metal production route, and therefore, promotion of environmentally friendly technologies, as coke production generates harmful pollutants
Overall decrease in energy consumption.

We believe that faster kinetics is attributed to the better surface contact between the reactants and to the higher carbon activity. Preferably the CO concentration in the reactor atmosphere is minimised because CO reduces the kinetics and extent of reduction.

Since the reduction of ore occurs at the ore/gas interface, greater porosity of the oxide material results in greater contact area and kinetics.

The manganese carbide produced by the process in accordance with the invention may be used to produce alloys, for example, by smelting of metal carbide, or directly used in steelmaking.

The present invention extends to the manganese carbide product produced by the process of the invention. The invention also extends to metals and alloys produced from manganese carbides formed by the process of the invention.

In order that the invention may be more readily understood we provide the following non-liming embodiments.

MODES FOR CARRYING OUT THE INVENTION

Figure 1:
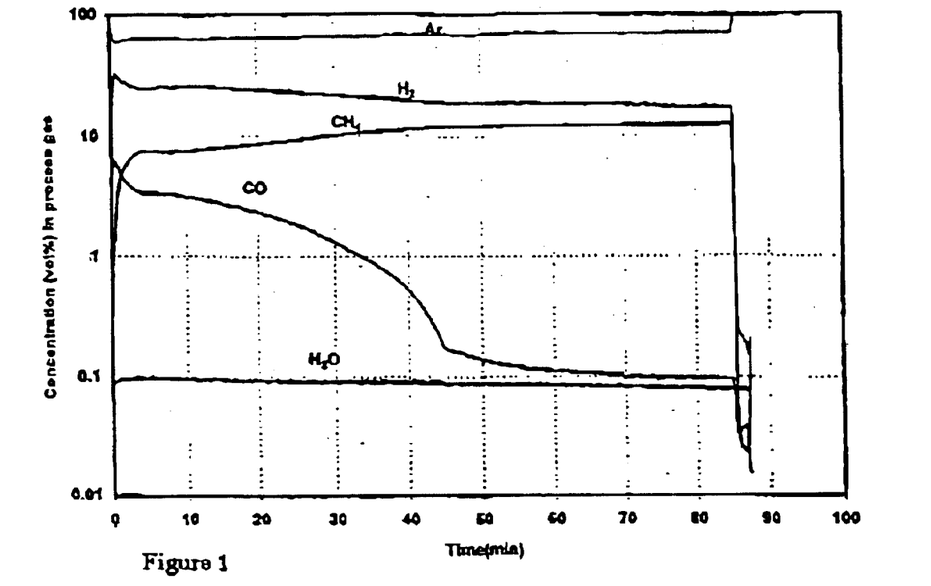
FIG. 1 is a graph showing exit gas composition in the reduction of pure MnO by methane-hydrogen-argon mixture (15 vol % $CH_4$-20 vol % $H_2$-65 vol % Ar) at 1150° C.

Pure manganese oxide MnO and two manganese ores (Groote Eylandt, Australia and Wessels, South Africa) were reduced by a gas mixture containing hydrogen and methane to metallic (carbide) state at temperatures 1000° C.–1200° C. Argon was used as a carrying gas although nitrogen could also be used for this purpose or none at all. Extent and rate of manganese oxide or manganese ore reduction were monitored using a mass spectrometer. It was experimentally confirmed that the reaction of maganese oxide reduction proceeds with the formation of CO in accordance with reaction (1). This is seen from FIG. 1, which presents the exit gas composition in the reduction of pure MnO by CH$_6$—H$_2$—Ar gas mixture (15 vol % CH$_4$, 20 vol % H$_2$) at 1150° C.

1) Reduction of Pure MnO

Figure 2:
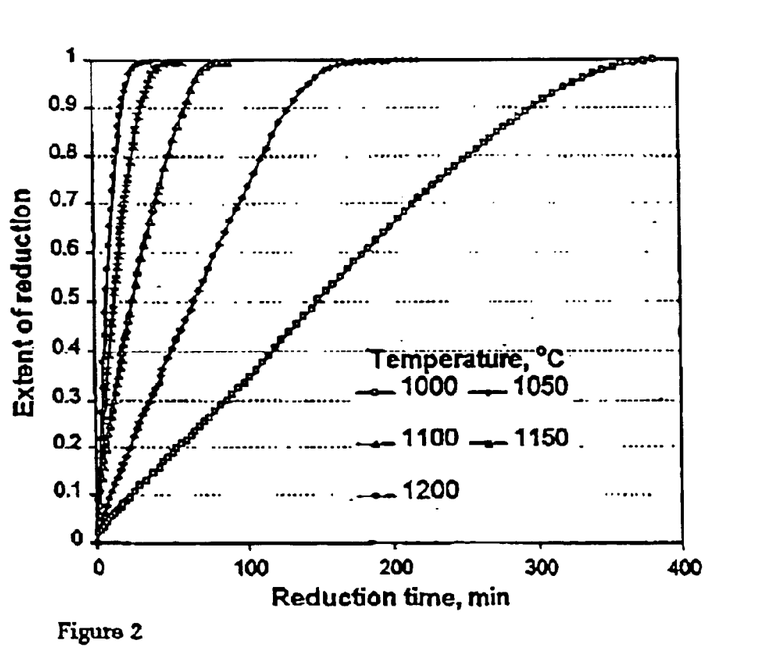
FIG. 2 is a graph showing extent of reduction of pure MnO by $CH_4$—$H_2$—Ar gas mixture (15 vol % $CH_4$-20 vol % $H_2$-65 vol % Ar) at different temperatures.
Figure 3:
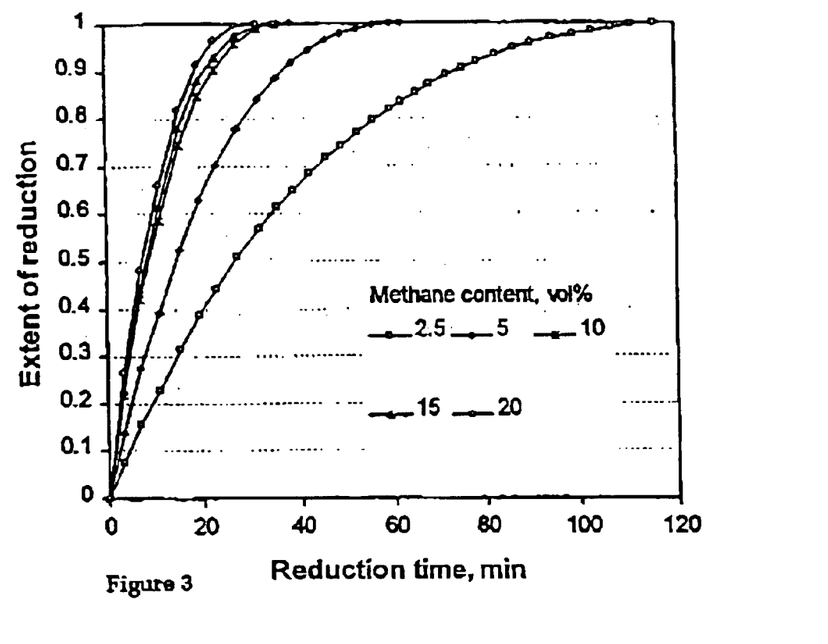
FIG. 3 is a graph showing extent of reduction of MnO by methane containing gas mixture with different methane content at 1200° C. (hydrogen content was kept at 20 vol % $H_2$)
Figure 4:
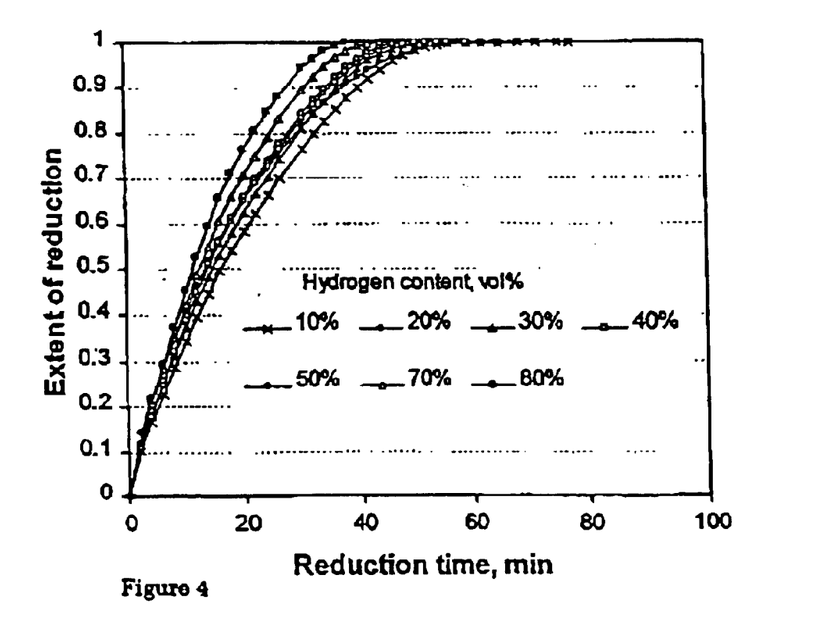
FIG. 4 is a graph showing extent of reduction of MnO by methane containing gas mixture with different hydrogen content at 1150° C. (hydrogen content was constant at 15 vol %)
Figure 5:
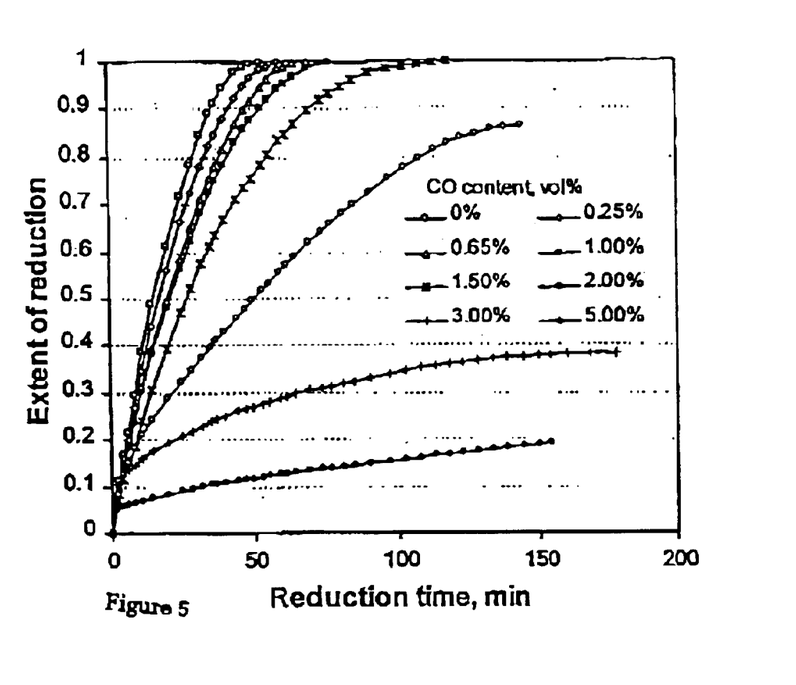
FIG. 5 is a graph showing the effect of CO contents on the reduction of MnO by methane-hydrogen mixture (10 vol % $CH_4$-20 vol % $H_2$) at 1150°C.

Rate and extent of manganese oxide reduction as functions of temperature is illustrated in FIG. 2. The degree of manganese reduction is close to 100% in the temperature range 1000° C.–1200° C. The rate of reduction of manganese oxide increases with increasing temperature. Reduction of MnO was also examined as a function of gas composition. Results are presented in FIGS. 3–5.

Figure 6:
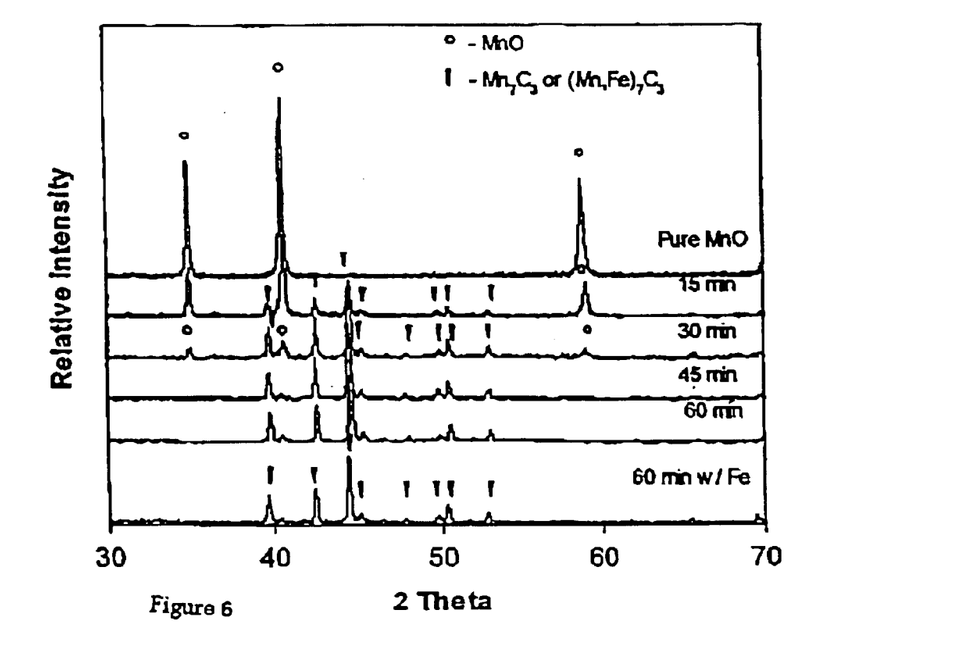
FIG. 6 shows X-ray diffraction patterns at various stages of reduction of SO by methane containing gas mixtures at 1150° C.
Figure 7:
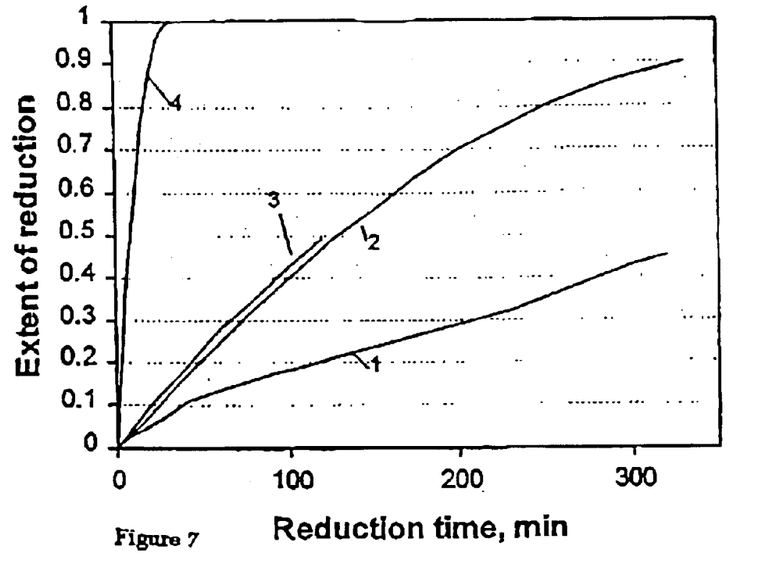
FIG. 7 is a graph showing reduction curves for pure MnO reduced by 1—graphite in $CO^1$ atmosphere at 1320° C.; 2—graphite in argon[1] atmosphere at 1200° C.; 3—graphite in argon[2] atmosphere at 1200° C.; 4—$CH_4$—$H_2$—Ar gas at 1200° C.
Figure 8:
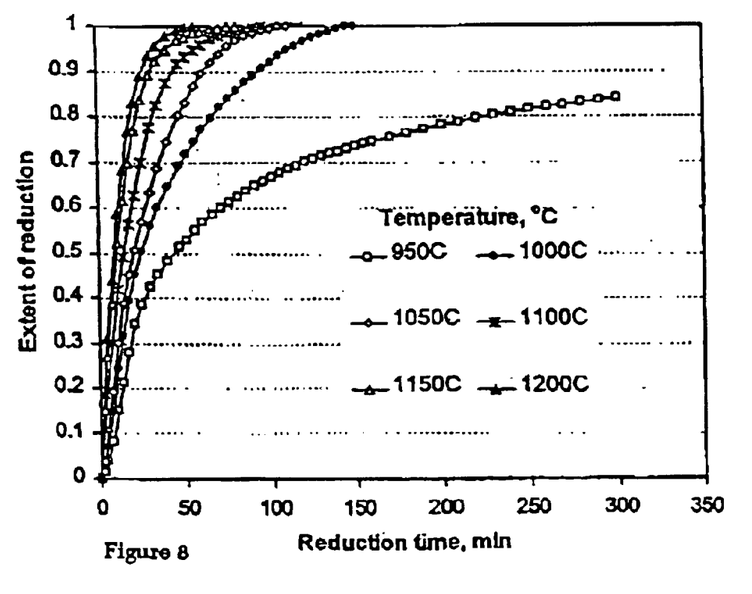
FIG. 8 is a graph showing reduction of Wessels Mn ore by methane-hydrogen mixture (10 vol % $CH_4$-50 vol % $H_2$-40 vol % Ar) at different temperatures.
Figure 9:
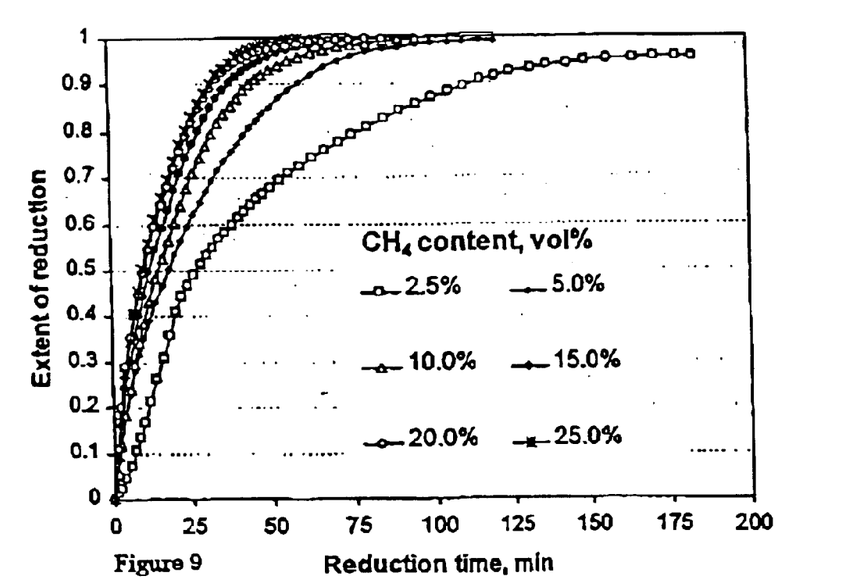
FIG. 9 is a graph showing Reduction of Wessels Mn ore by methane containing gas mixture with different methane content at 1100° C. (hydrogen content was kept at 50 vol % $H_2$)
Figure 10:
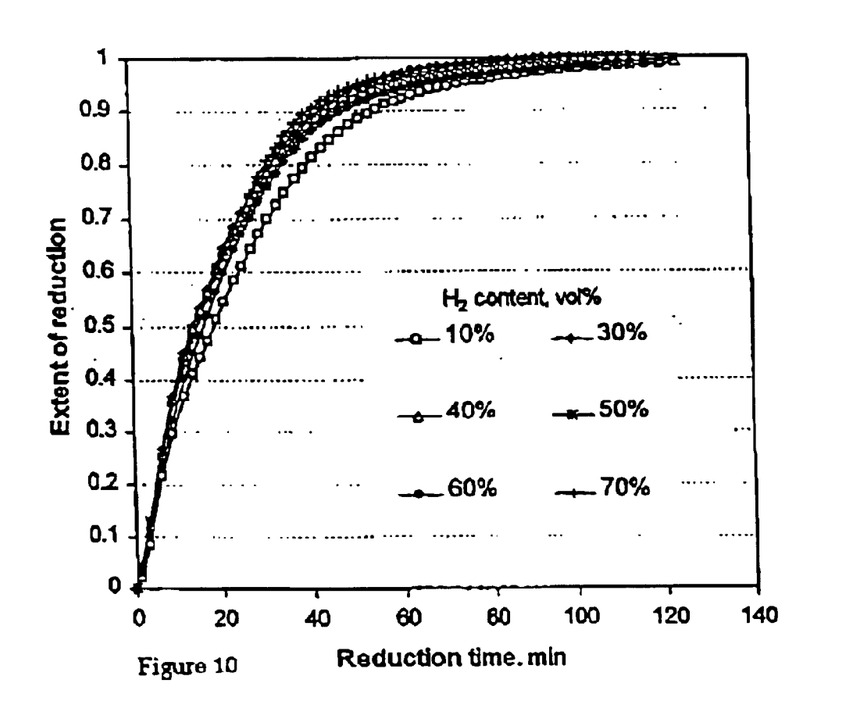
FIG. 10 is a graph showing reduction of Wessels raw Mn ore by methane containing gas mixture with different hydrogen content at 1100° C. (methane content was kept at 10 vol % $CH_4$.
Figure 11:
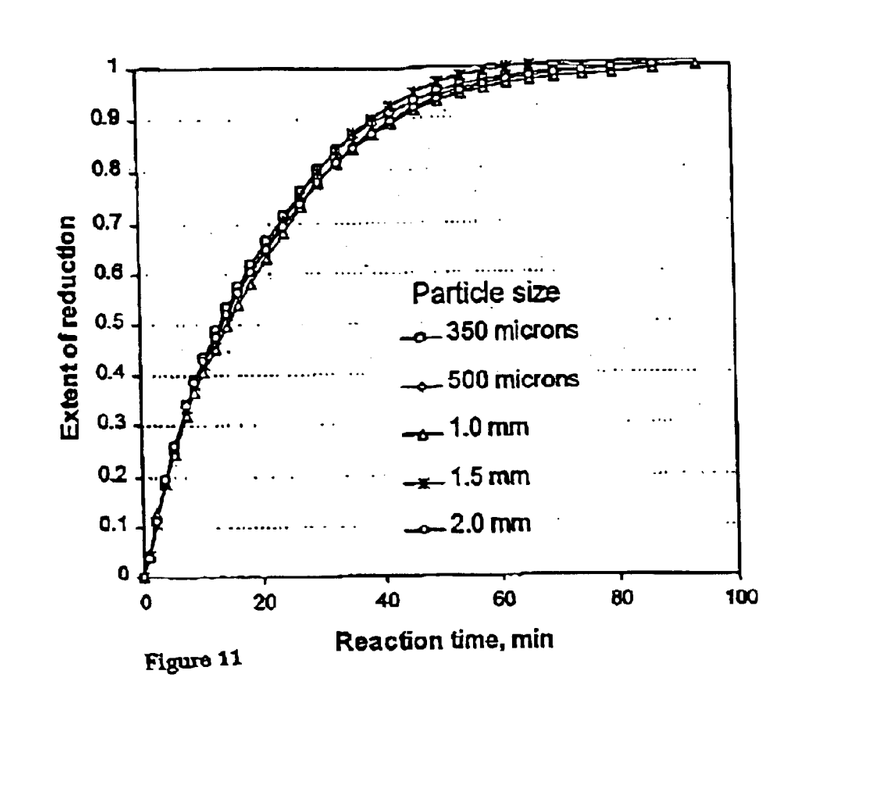
FIG. 11 is a graph showing the progress of the reduction of Wessels Mn raw ore with different particle size by methane containing gas mixture Temperature: 1100° C. Reducing gas composition: 10 vol % $CH_4$, 40 vol % Ar and 50 vol % $H_2$.

Reduced samples were subjected to XRD analysis. FIG. 6 displays X-ray diffraction patterns at various stages of reduction of pure MnO at 1150° C. The closest match of the XRD pattern of the manganese carbide corresponded to Mn$_2$C$_3$. FIG. 7 presents reduction curves for pure MnO reduced at 1200° C. by graphite in argon atmosphere, at 1320° C. by graphite in CO, and by CH$_4$—H$_2$—Ar gas mixture. The rate of MnO reduction by CH$_4$—H$_2$—Ar gas is 10 times faster than that by graphite in argon, and 20 times faster than that by graphite in CO atmosphere at 1320° C.

The optimal conditions for MnO reduction to carbide phase in the stated experiments, are the follow: a) temperature: 1200° C., below the manganese melting temperature, b) methane concentration in the gas phase: 10–15 vol %, c) hydrogen concentration in the gas phase: 20–90 vol %.

2. Reduction of Manganese Ores

Experiments were conducted with manganese ores from Wessels Mines South Africa and Groote Eylandt, Australia. Their compositions are given in Table 1 below.

TABLE 1

Compositions of Wessels and Groote Eylandt (G. E.) manganese ores

| Ore | MnO | SiO$_2$ | Fe$_2$O$_2$ | Al$_2$O$_3$ | CaO | BaO | K$_2$O | Na$_2$O | TiO$_2$ |
|---|---|---|---|---|---|---|---|---|---|
| Wessels | 62.2 | 3.2 | 15.71 | 0.351 | 5.4 | 0.4 | 0.007 | 0.027 | 0.013 |
| G. E. | 79.4 | 4.4 | 9.60 | 1.19 | 0.03 | 0.8 | 1.30 | 0.30 | 0.15 |

The differences between these ores are the following:

Wessels Mn ore has higher Fe (11%) and CaO (5.4%) compared to 6.7% Fe and 0.03% CaO in Groote Eylandt ore.

Distribution of iron in the matrix of the Wessels ore is more uniform. Fe in the Groote Eylandt ores is concentrated along the cleavage of the ore.

The presence of alkali oxides (1.3% K$_2$O and 0.3% Na$_2$O) and law CaO content in Groote Eylandt ore lower the melting temperature of the ore.

The Wessels Mn ore contains 74 ppm K$_2$O and 275 ppm Na$_2$O.

Wessels Mn ore contain lesser amount of SiO$_2$ (3.2%) and Al$_2$O$_3$ (0.351%) compared to Groote Eylandt Mn ore with 4.38% SiO$_2$ and 1.19% Al$_2$O$_3$.

2.1 Reduction of Wessels Mn Ores

Experimental data on the extent and rate of ore reduction as functions of temperature, gas composition and ore size am shown in FIGS. 8–11. The reduction rate of Wessels manganese ore increases with temperature. The degree of manganese reduction is close to 100% in the temperature range from 1000° C. to 1200° C.

Figure 12:
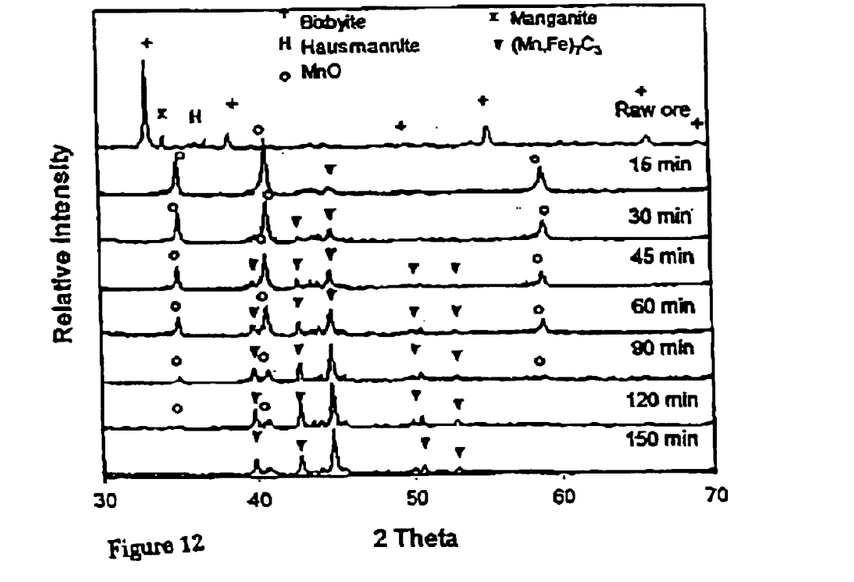
FIG. 12 shows X-ray diffraction patterns of Wessels Mn ore at different stages of reduction by methane-containing gas mixtures at 1000° C.
Figure 13:
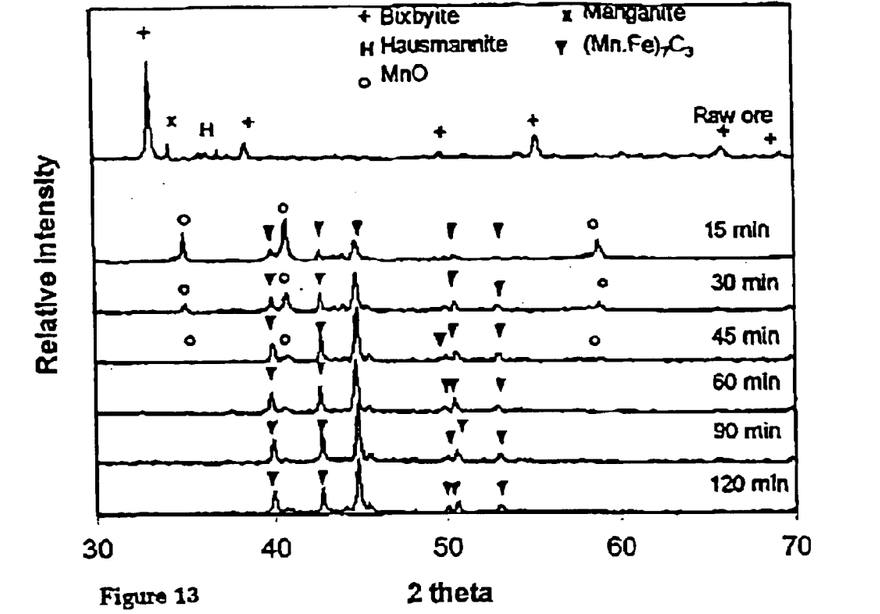
FIG. 13 shows X-ray diffraction patterns of Wessels Mn ore at different stages of reduction by methane-containing gas mixtures at 1100° C.
Figure 14:
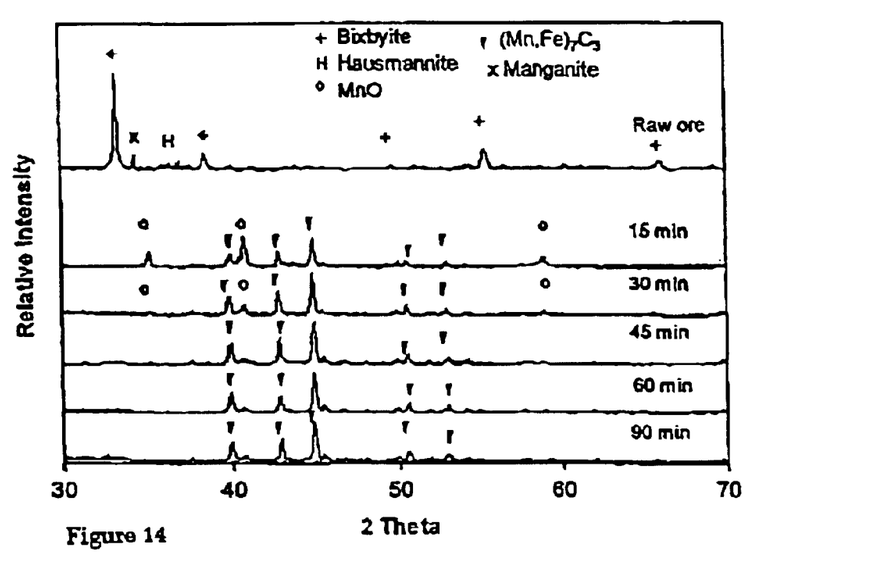
FIG. 14 shows X-ray diffraction patterns of Wessels Mn ore at different stages of reduction by methane-containing gas mixtures at 1200° C.

Reduced samples were subjected to XRD analysis. FIGS. 12–14 display typical X-ray diffraction patterns at various stages of reduction of Wessels manganese ore at 1000, 1100 and 1200° C. The ferro-manganese carbide was identified as (Mn,Fe)$_7$C$_3$.

Figure 15:
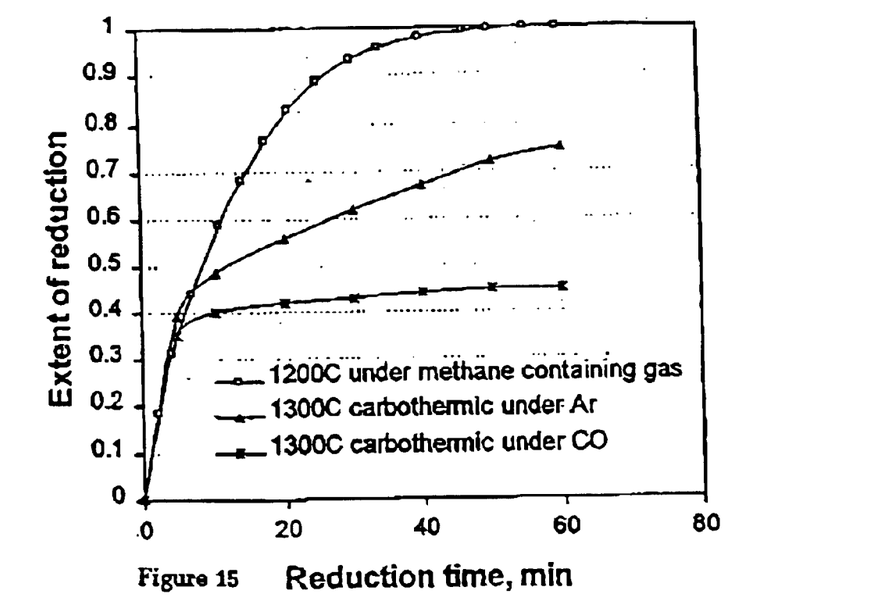
FIG. 15 shows reduction curves for Wessels Mn ores reduced by graphite in Ar and CO atmospheres at 1300° C. and by $CH_4$—$H_2$—Ar gas mixture at 1200° C.

FIG. 15 shows the reduction curves for Wessels Mn ores reduced by graphite (carbothermic process) and by CH$_4$—H$_2$—Ar gas mixtures. The rate of reduction of Wessels Mn ore by CH$_4$—H$_2$—Ar gas at 1200° C. is much faster than by graphite in argon or CO atmosphere at 1300° C. The reduction of manganese ores with solid carbon is not complete even at 1350C.

The optimum conditions for the reduction of Wessels Mn ore were established as follows: a) temperature: 1150° C. which is below the softening temperature for this type of ore, b) methane concentration; 10–15 vol %. c) size range: 1–3 mm.

Phase analysis revealed that the Wessels Mn ore is reduced into the metallic (carbide) state with formation of [Fe$_{1-x}$,Mn$_x$]$_7$C$_3$. The non-metallic phase contained oxides of silicon, aluminium, calcium, barium and other minor elements.

The degree of manganese ore reduction under optimum conditions was close to 100%. If reduction was not complete (experimental conditions were not optimal, manganese oxide was observed in the slag phase, while iron was generally completely reduced into the metallic phase.

2.2 Reduction of Groote Eylandt Mn Ores

Phase analysis showed that the Groote Eylandt Mn ore is not homogeneous: (1) ore composition depends on the ore size, (2) the separate silica phase is detected, and (3) iron oxide is no-uniformly distributed in the ore, predominantly along the cleavages. To obtain a homogeneous ore for reduction experiments, fine portion of the ground ore (100 microns) was sintered in a muffle furnace at 1200° C. for 5 hours in air. The sintered ore was then crushed and ground to 1.0 mm.

Figure 16:
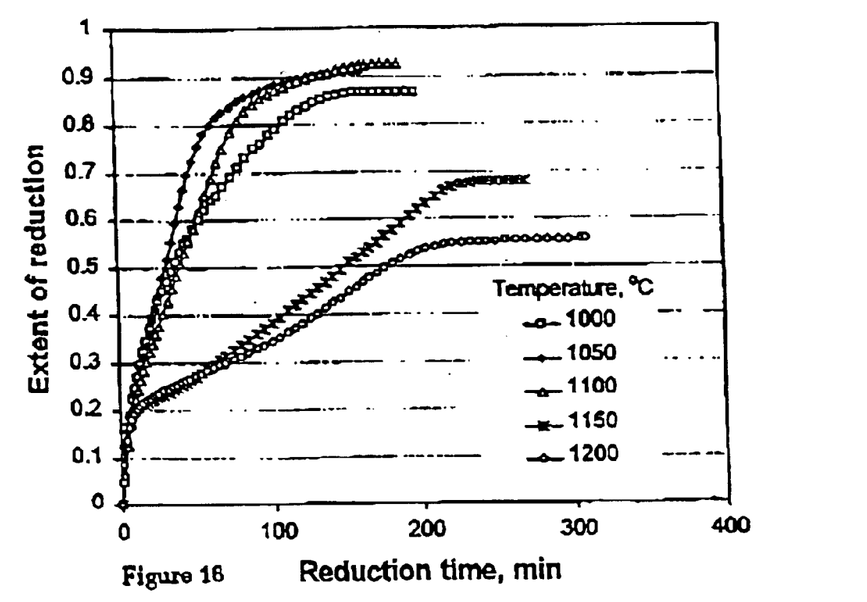
FIG. 16 is a graph showing reduction of Groote Eylandt Mn ore by methane-hydrogen mix (10 vol % $CH_4$-50 vol % $H_2$-40vol % Ar) at different temperatures.
Figure 17:
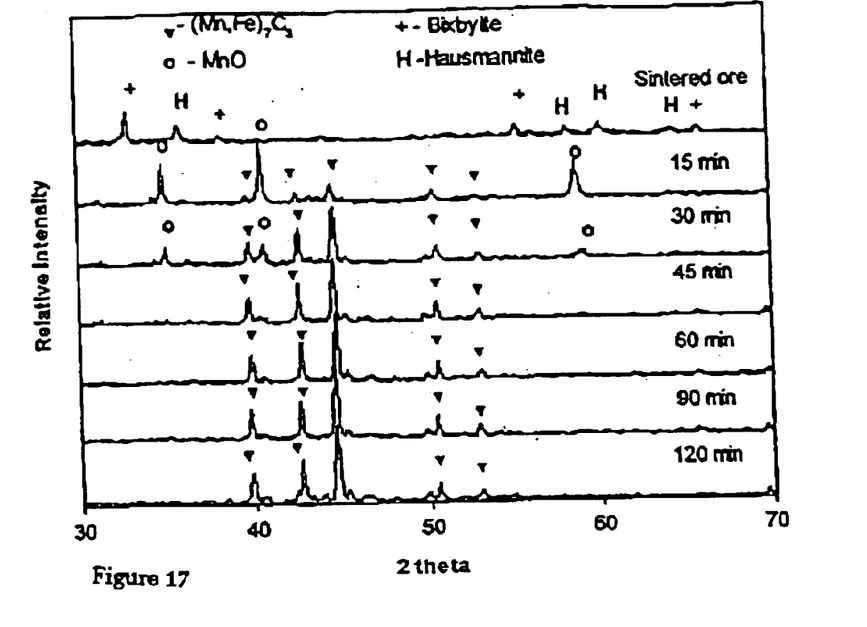
FIG. 17 shows X-ray diffraction patterns at various stages of reduction of sintered Groote Eylandt Mn ores at 1050° C.
Figure 18:
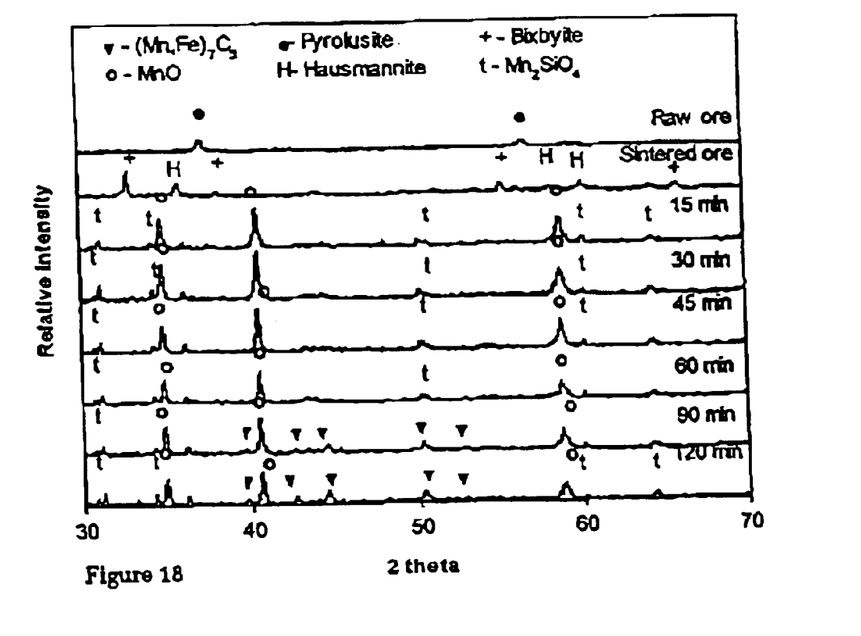
FIG. 18 shows X-ray diffraction patterns at various stages of reduction of sintered Groote Eylandt Mn ores at 1200° C.
Figure 19:
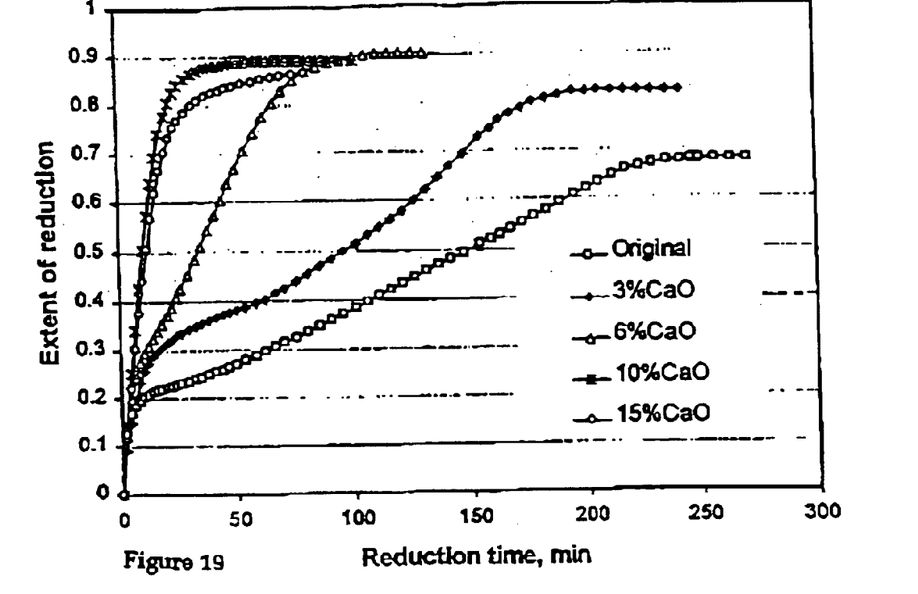
FIG. 19 is a graph showing the effect of CaO on the rate and extent of reduction of Groote Eylandt ore by methanehydrogen-argon mixture (10 vol % CH$_4$-50 vol % H$_2$-40 vol % Ar) at 1150° C.
Figure 20:
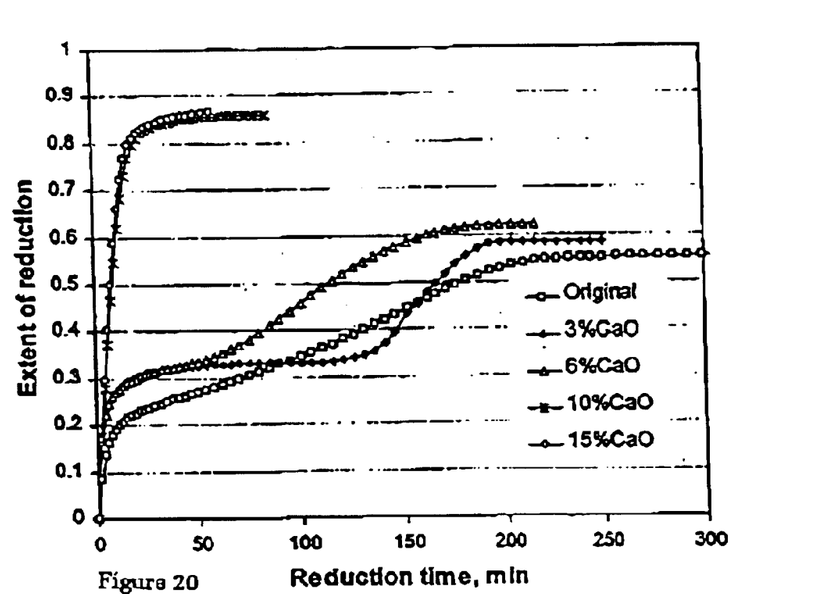
FIG. 20 is a graph showing the effect of CaO on the rate and extent of reduction of Groote Eylandt ore by methane-hydrogen-argon mixture (10 vol % CH$_4$-50 vol % H$_2$-40 vol % Ar) at 1200° C.
Figure 21:
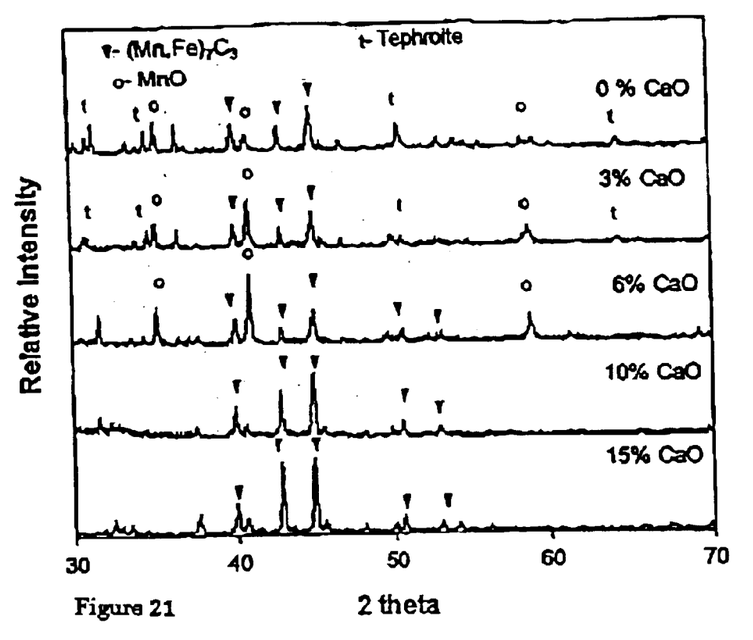
FIG. 21 is an X-ray diffraction patterns of reduced sintered Groote Eylandt Mn ore doped with CaO at 1200° C.
Figure 22:
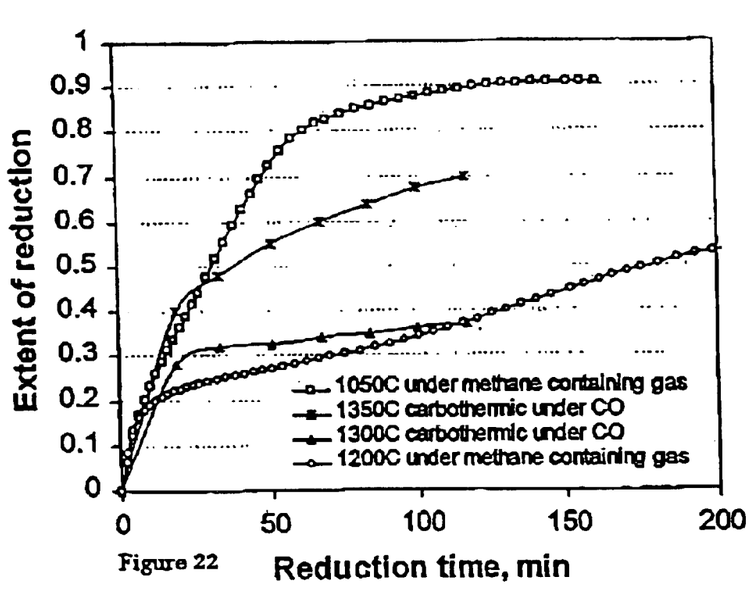
FIG. 22 is a graph showing reduction curves for Groote Eylandt Mn ores reduced by graphite in CO atmospheres at 1300° C. and 1350° C. and by CH$_4$—H$_2$—Ar gas mixture at 1050 and 1200° C.

Experimental data on the extent and rate of ore reduction as a function of temperature is shown in FIG. 16. The reduction rates of Groote Eylandt manganese ore increase with increasing temperature from 1000 to 1050° C. It was practically independent of temperature in the temperature range 1050–1100° C., and decreased with further increase in temperature. The optimum temperature for the reduction of sintered ore is 1050–1110° C. The extent of reduction is more than 90%. X-ray diffraction patterns obtained at different stages of reduction at 1050 and 1200° C. are shown in FIGS. 17 and 18. There is a significant formation of tephroite ($Mn_2SiO_4$) at higher temperatures, which has a low melting temperature. An addition of lime (CaO) to the ore significantly increases the rate and extent of reduction at elevated temperature (FIGS. 19–20). The ore doped with 10–15% CaO at 1200° C. contained no tephroite (FIG. 21). FIG. 22 shows a comparison of the reduction curves for Groote Eylandt Mn ores reduced by graphite (carbothermic process) and by methane containing gas mixtures.

The optimum conditions for the reduction of Groote Eylandt Mn ore were established as follows: a) temperature: 1050–11000° C., b) methane concentration: 10–15 vol %, c) size range: 1–3 mm. It is recommended to add lime to GE ore in the amount of 10–15 wt %. The optimum reduction temperature in this case is 1100–1200° C. under otherwise the same conditions.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A process for the reduction of a manganese oxide to manganese carbide, the process including contacting the manganese oxide in solid form with a gaseous reducing/carburising agent comprising a gaseous hydrocarbon and optionally an inert gas at a temperature in the range of about 1000–1250° C.

2. A process according to claim 1, wherein the gaseous reducing/carburising agent is a hydrogen-hydrocarbon gas mixture.

3. A process according to claim 2, wherein the hydrocarbon is selected from the group consisting of methane, ethane, propane and a mixture of two or more thereof.

4. A process according to claim 3, wherein the hydrocarbon is methane.

5. A process according to claim 1, wherein the reducing/carburising agent is a hydrogen/natural gas mixture.

6. A process according to claim 1, wherein the optional inert gas is nitrogen or argon.

7. A process according to claim 2, wherein the hydrocarbon is present in an amount of about 5–20%.

8. A process according to claim 2, wherein the hydrogen is present in an amount of about 20–95%.

9. A process according to claim 1, wherein the,inert gas is present in an amount of about of 0–60%.

10. A process according to claim 1, wherein the temperature is in the range of about 1050–1150° C.

11. A process according to claim 1, wherein the manganese oxide is in the form of a manganese oxide-containing ore.

12. A process according to claim 11, wherein the manganese oxide-containing ore is a manganese ore.

13. A process according to claim 12, wherein the manganese ore is a Groote Eylandt manganese ore.

14. A process according to claim 12, wherein the manganese ore is a Wessels manganese ore.

15. A process according to claim 11, wherein the ore is an ore preconcentrate or concentrate.

16. A process according to claim 1, wherein the ore is pretreated by calcination with a hot inert or reducing gas.

17. A process according to claim 1, wherein the reduction of the manganese oxide to manganese carbide is carried out in the presence of an agent that extends the metastability of the carburising/reducing agent.

18. A process according to claim 16, wherein the metastability extending agent is sulfur.

* * * * *